US012644838B2

(12) United States Patent
Schmidt et al.

(10) Patent No.: US 12,644,838 B2
(45) Date of Patent: Jun. 2, 2026

(54) METHOD, DEVICE AND NON-TRANSITORY COMPUTER-READABLE MEDIUM FOR LOCALIZING INDIVIDUAL EMITTERS IN A SAMPLE

(71) Applicant: ABBERIOR INSTRUMENTS GMBH, Goettingen (DE)

(72) Inventors: Roman Schmidt, Goettingen (DE); Andreas Schoenle, Goettingen (DE); Winfried Willemer, Bovenden (DE)

(73) Assignee: ABBERIOR INSTRUMENTS GMBH, Goettingen (DE)

( * ) Notice: Subject to any disclaimer, the term of this patent is extended or adjusted under 35 U.S.C. 154(b) by 359 days.

(21) Appl. No.: 18/228,081

(22) Filed: Jul. 31, 2023

(65) Prior Publication Data

US 2024/0046595 A1     Feb. 8, 2024

(30) Foreign Application Priority Data

Aug. 2, 2022     (DE) ..................... 10 2022 119 327.6

(51) Int. Cl.
 *G01N 21/64*     (2006.01)
 *F21V 8/00*     (2006.01)
 *G06V 10/141*     (2022.01)

(52) U.S. Cl.
 CPC ....... *G01N 21/6458* (2013.01); *G02B 6/0008* (2013.01); *G06V 10/141* (2022.01)

(58) Field of Classification Search
 CPC ... G02B 6/0008; G01N 21/6458; G06V 10/14
 See application file for complete search history.

(56) References Cited

U.S. PATENT DOCUMENTS

2016/0305884 A1    10/2016  Hell
2017/0082844 A1     3/2017  Hell et al.
        (Continued)

FOREIGN PATENT DOCUMENTS

DE      10 2011 055 367 A1     5/2013
DE      10 2013 114 860 A1     5/2015
        (Continued)

OTHER PUBLICATIONS

F. Balzarotti et al., Nanometer resolution imaging and tracking of fluorescent molecules with minimal photon fluxes, Science 355 (6325), Feb. 10, 2017, 80 pages.
        (Continued)

*Primary Examiner* — Michael P Mooney
(74) *Attorney, Agent, or Firm* — MOSER TABOADA

(57)     ABSTRACT

The invention relates to a method for localizing individual emitters in a sample, comprising a pre-localization comprising an illumination of the sample with illumination light, wherein the illumination light induces or modulates light emissions of an individual and stationary emitter in the sample, detecting the light emissions of the emitter and estimating the position of the emitter in the sample from the detected light emissions and a subsequent main localization comprising illuminating the sample with an intensity distribution of the illumination light at illumination positions, the intensity distribution comprising a local minimum, detecting the light emissions of the emitter for the illumination positions, and determining the position of the emitter in the sample from the light emissions detected for the illumination positions, wherein the illumination positions are arranged in a first iteration about the estimated position and wherein the illumination positions in at least one second iteration are arranged around the position of the emitter determined in the preceding iteration, wherein the illumination positions in the (Continued)

first iteration and the at least one second iteration form a respective illumination pattern comprising a maximum extension, wherein the maximum extension of the illumination pattern is kept constant during the main localization. The invention further relates to a light microscope for carrying out the method, a computer program and the use of a fiber bundle for the method.

27 Claims, 11 Drawing Sheets

(56) References Cited

U.S. PATENT DOCUMENTS

| | | | |
|---|---|---|---|
| 2018/0259458 A1 | 9/2018 | Hell et al. | |
| 2020/0393378 A1 | 12/2020 | Hell et al. | |
| 2023/0003651 A1 | 1/2023 | Harke et al. | |
| 2024/0045190 A1* | 2/2024 | Schmidt | G02B 21/008 |

FOREIGN PATENT DOCUMENTS

| | | | |
|---|---|---|---|
| DE | 10 2016 117 096 A1 | 3/2017 | |
| DE | 10 2016 119 262 A1 | 4/2018 | |
| DE | 10 2016 119 263 A1 | 4/2018 | |
| DE | 10 2016 119 264 A1 | 4/2018 | |
| DE | 10 2017 104 736 B3 | 8/2018 | |
| DE | 10 2019 008 989 B3 | 6/2021 | |
| DE | 10 2020 127 320 B3 | 1/2022 | |
| DE | 10 2020 127 385 B3 | 3/2022 | |
| DE | 10 2021 100 564 A1 | 8/2022 | |
| EP | 3 372 989 A1 | 9/2018 | |
| EP | 4 151 987 A1 | 3/2023 | |
| WO | WO 2013/072273 A1 | 5/2013 | |
| WO | WO 2020/128106 A1 | 6/2020 | |
| WO | WO 2022/029280 A1 | 2/2022 | |
| WO | WO 2022/218834 A1 | 10/2022 | |

OTHER PUBLICATIONS

K. C. Gwosch et al., MINFLUX nanoscopy delivers 3D multicolor nanometer resolution in cells, Nat. Methods, 33 pages (2020), 33 pages, www.nature.com/naturemethods, https://doi.org/10.1038/s41592-019-0688-0.

R. Schmidt et al., MINFLUX nanometer-scale 3D imaging and microsecond-range tracking on a common fluorescence microscope, Nature Communications, 2021, 21 pages, https://doi.org/10.1038/s41467-021-21652-z | www.nature.com/naturecommunications.

L. A. Masullo et al., Pulsed Interleaved MINFLUX, Nano Letters, 2021, 50 pages.

L. A. Masullo et al., "A common framework for single-molecule localization using sequential structured illumination". Biophysical Reports, 2022, 35 pages.

E. Slenders et al., ISM-FLUX: single-step MINFLUX with an array detector, bioRxiv, Apr. 19, 2022, 16 pages, DOI: 10.1101/2022.04.19.488747 (2022).

DPMA Examination Report for DE 10 2022 119 327.6 dated Jul. 17, 2023.

* cited by examiner

Fig. 1A
Fig. 1B
Fig. 1C
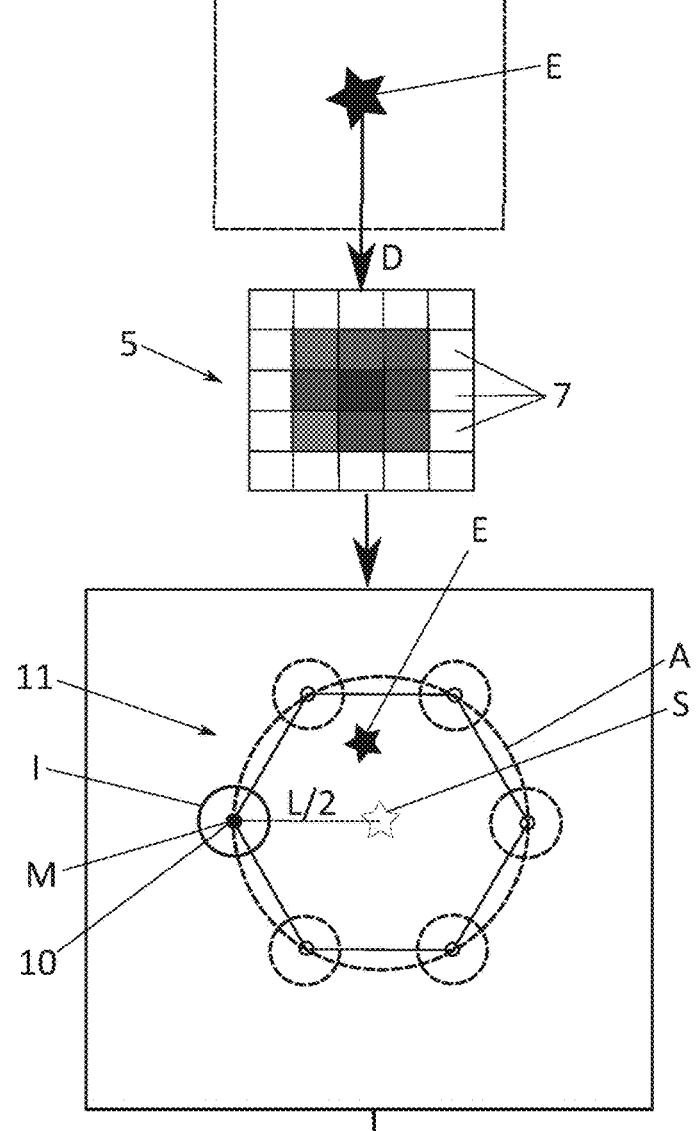
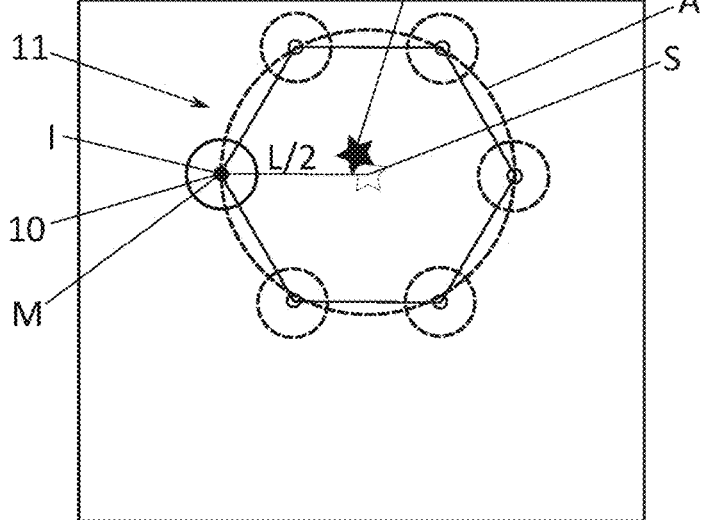

METHOD, DEVICE AND NON-TRANSITORY COMPUTER-READABLE MEDIUM FOR LOCALIZING INDIVIDUAL EMITTERS IN A SAMPLE

TECHNICAL FIELD OF THE INVENTION

The invention relates to a method, a device and a non-transitory computer readable medium for localizing individual emitters in a sample according to the MINFLUX principle, and to the use of a fiber bundle in the method according to the present disclosure.

PRIOR ART

Under the term "MINFLUX microscopy" or "MINFLUX methods" certain localization and tracking methods for individual emitters are summarized, in which a light distribution of illumination light, which induces or modulates the light emission of the emitter, is generated at the focus in the sample, the light distribution comprises a local minimum, and in which the position of an individual emitter is determined by detecting light emissions from the emitter, taking advantage of the fact that the smaller the distance between the emitter and the minimum of the light distribution, the less light is emitted from the emitter. Due to the latter fact, MINFLUX processes are particularly photon efficient, especially compared to so-called PALM/STORM localization processes. Additionally, in certain embodiments of the method, there is also the advantage that the emitters to be localized or tracked are exposed to relatively little light compared to other localization methods and are therefore less bleached.

The individual light-emitting emitters are, in particular, fluorophores and the illumination light is, in particular, excitation light which excites the fluorophores, whereupon they emit fluorescent light. Alternatively, the light-emitting emitters may also be, for example, light-scattering particles such as gold nanoparticles.

In particular, the light distribution with the local minimum may be 2D donut-shaped or 3D donut-shaped.

A method of the type described above was described in patent application DE 10 2011 055 367 A1 for single molecule tracking. According to the method disclosed there, the position of a single fluorophore is tracked over time by tracking an excitation light distribution with a local minimum to the fluorophore such that the fluorescence emission rate is minimal.

Patent application DE 10 2013 114 860 A1 describes another localization method in which the sample is scanned at grid points with the local minimum of an excitation light distribution to localize individual fluorophores.

The term "MINFLUX" is first used in the publication "Balzarotti F, Eilers Y, Gwosch K C, Gynnå A H, Westphal V, Stefani F D, Elf J, Hell S W. Nanometer resolution imaging and tracking of fluorescent molecules with minimal photon fluxes. Science. 2017 Feb. 10; 355(6325):606-612". In the method described there, the MINFLUX principle is concretely implemented by first pre-localizing a single fluorophore by scanning it with a first Gaussian-shaped excitation light distribution and then placing a second donut-shaped excitation light distribution at points that form a symmetric pattern of illumination positions around the fluorophore's position estimated in the pre-localization. The photon counts registered for each illumination position are then used to determine the position of the fluorophore to within a few nanometers using a maximum-likelihood estimator.

Further variants and embodiments of a MINFLUX localization are described in patent applications DE 10 2016 119 262 A1, DE 10 2016 119 263 A1 and DE 10 2016 119 264 A1.

The publication "Gwosch K C, Pape J K, Balzarotti F, Hoess P, Ellenberg J, Ries J, Hell S W. MINFLUX nanoscopy delivers 3D multicolor nanometer resolution in cells. Nat Methods. 2020 February; 17(2):217-224" describes iterative 2D and 3D MINFLUX localization methods. Here, the sample is illuminated in several iteration steps at illumination positions with the minimum of a donut-shaped excitation light distribution, wherein the illumination positions form a symmetric illumination pattern centered around the position of the fluorophore estimated in each previous step, and wherein the illumination positions are placed closer around the currently estimated position of the fluorophore in each iteration step. This allows very high positional accuracy to be achieved in a few steps.

Another iterative MINFLUX localization and tracking method using a modified position estimator and based on a commercial microscope setup is presented in "Schmidt R, Weihs T, Wurm C A, Jansen I, Rehman J, Sahl S J, Hell S W. MINFLUX nanometer-scale 3D imaging and microsecond-range tracking on a common fluorescence microscope. Nat Commun. 2021 Mar. 5; 12(1):1478".

The light that induces or modulates the light emission of the emitters may also be STED (stimulated emission depletion) light, for example. For example, patent applications DE 10 2017 104 736 A1 and EP 3 372 989 A1 describe MINFLUX-like methods based on superposition of an excitation light distribution with local maximum with a STED light distribution with local minimum. The sample is scanned by shifting the STED distribution with the STED minimum and the position of the fluorophore is determined from the measured values of fluorescence intensity at different positions of the STED intensity distribution. Here, in contrast to the MINFLUX methods described previously, the fluorophore emits more light with decreasing distance from the local minimum.

The iterative MINFLUX methods described above reliably achieve very high position accuracy but have the disadvantage of requiring powerful processors and controllers that combine computationally expensive live position estimation with feedback control of beam deflection units such as electro-optic deflectors.

Patent application WO 2020/128106 A1 and the publication "Masullo L A, Steiner F, Zahringer J, Lopez L F, Bohlen J, Richter L, Cole F, Tinnefeld P, Stefani F D. Pulsed Interleaved MINFLUX. Nano Letters 2021, 21 (1), 840-846" describe, among other things, embodiments of MINFLUX localization methods in which the positions at which the sample is illuminated with the minimum of the excitation light distribution are fixed by arrays of optical fibers, wherein the excitation light is generated by a pulsed laser, and wherein individual excitation light pulses are output with a time delay through the different fiber ends of the optical fibers.

The publication "Masullo L A, Lopez L F, Stefani F D. A common framework for single-molecule localization using sequential structured illumination. Biophysical Reports 2022 2(1), 100036" describes a variant of the MINFLUX technique, referred to as RASTMIN, in which a small area within a microscopic field of view containing a single emitter is scanned in a Cartesian grid with the minimum of a donut-shaped excitation light distribution, and the position of the emitter is determined from the detected light intensities.

In the publication "Slenders E, Vicidomini G. ISM-FLUX: single-step MINFLUX with an array detector. bioRxiv; 2022. DOI: 10.1101/2022.04.19.488747", a MIN-FLUX method is described in which the light emitted from a single fluorophore is detected in a position-dependent manner using an array detector to determine the position of the fluorophore in a single localization step non-iteratively, without repositioning the illumination pattern and without pre-localization.

However, position determination without pre-localization has the disadvantage that photoactivation is necessary to obtain individual light-emitting fluorophores in the image field. This limits the applicability of the method, since not all fluorophores can be photoactivated.

Objective

Based on the disadvantages of the prior art described above, the objective of the present disclosure is to provide a photon-efficient localization method for individual emitters that is as simple as possible in terms of apparatus and can be universally applied.

Solution

This objective is attained by the subject matter of independent claims. Advantageous embodiments of the disclosure are indicated in the subclaims and are described below.

Description

A first aspect of the present disclosure relates to a method for localizing individual emitters in a sample, comprising a pre-localization comprising the steps of.
- illuminating the sample with illumination light, wherein the illumination light induces or modulates light emissions from an individual and stationary emitter in the sample;
- detecting light emissions from the emitter;
- estimating the position of the emitter in the sample from the detected light emissions;

and a subsequent main localization comprising the steps of
- illuminating the sample with an intensity distribution of the illumination light or another illumination light at illumination positions, the intensity distribution comprising a local minimum;
- detecting the light emissions of the emitter for the respective illumination positions;
- determining the position of the emitter in the sample from the light emissions detected for the illumination positions, According to the present disclosure, the illumination positions in the main localization are arranged in a first iteration around the position of the emitter estimated in the pre-localization, wherein at least one second iteration is carried out after the first iteration, wherein the illumination positions in the at least one second iteration are arranged around the position of the emitter determined in the preceding iteration, and wherein the illumination positions in the first iteration and the at least one second iteration form a respective illumination pattern comprising a maximum extension, wherein the maximum extension of the illumination pattern is kept constant during the main localization. Keeping the maximum extension of the illumination pattern constant means, in other words, that the maximum distance of the illumination positions from the position estimated in the pre-localization (in the first iteration) or the maximum distance of the illumination positions from the position determined in the respective preceding iteration (for the at least one second iteration) is constant during the main localization.

Here, as with iterative MINFLUX methods of the prior art, there is in particular the advantage that the positional accuracy can be increased step by step. At the same time, however, due to the constant maximum extension of the illumination pattern in the main localization, the method can be carried out with a much simpler and less expensive light microscope without fast beam displacement devices such as electro-optical deflectors. In addition, the control electronics can be constructed more simply because, although a feedback loop is required for repositioning the illumination positions, it does not require adaptive adjustment of the distance of the illumination positions from the respective estimated position.

In the individual iterations, the illumination positions may indeed be arranged differently from each other, i.e., form different illumination patterns, as long as the maximum extension of the illumination pattern remains constant in the iterations. Likewise, different numbers of illumination positions may be used in different iterations.

The term emitter refers to molecules, molecular complexes or particles that emit light when illuminated with the illumination light. In particular, the emitted light may be fluorescent light, Rayleigh scattered light or RAMAN scattered light. In particular, in this context, an emitter can be regarded as a point light source in the case of diffraction-limited imaging with a light microscope, and thus in particular comprises an extension in the range of the diffraction limit of optical microscopy or below. The emitters may be, for example, single fluorophores (fluorescent dyes), molecules or molecular complexes labeled with one or more fluorophores, or so-called quantum dots. The fluorescent dyes may be bound to the molecules by covalent or non-covalent interactions. Biological macromolecules such as proteins, for example, are often detected by binding to antibodies, which in turn are covalently linked to fluorescent dyes. Furthermore, an emitter in the sense of the present disclosure may also be, for example, a light-scattering nanoparticle, such as a gold nanoparticle.

By individual emitters is meant emitters that are optically separable or optically resolvable. This may mean that the emitters comprise a distance to each other that is above the diffraction limit of light microscopy. Alternatively, it is also possible that the light emissions of an emitter are registered during a time interval in which an adjacent emitter does not emit light, e.g., because it is in a dark state (in the case of fluorophores). In this way, e.g., emitters that have a distance below the diffraction limit but are blinking asynchronously can be resolved by light microscopy. Finally, it is also possible to resolve emitters that comprise a spacing below the diffraction limit but emit light of different wavelengths by optical microscopy by spectrally separating the emitted light, or to excite two emitters with different excitation spectra with different wavelengths to optically separate the emitters. Similarly, emitters having different emission lifetimes can be distinguished from each other by measuring the lifetime (e.g., by time-resolved single photon counting) and thus detected separately. All of these embodiments fall under the term "individual emitters". In particular, a sample with individual emitters can be obtained by adjusting the conditions of a labeling of the sample with fluorescent dyes in such a way that a desired labeling density of single molecules in the sample results, by selective photoactivation of fluorescent dyes and/or by adjusting the physicochemical properties of the sample environment (e.g., by reducing agents, oxidizing agents and certain enzymes in the sample) so that a certain blinking rate of the fluorescent dyes is achieved.

The emitters to be localized are stationary in the sample during the localization method, i.e., on the time scale of the localization method. Thus, the method according to the present disclosure is not a tracking method for tracking the position of an emitter moving in the sample.

The sample is illuminated with the illumination light, in particular by means of a light microscope, and further in particular through an objective of the light microscope. The illumination light is focused into the sample, in particular during the main localization and optionally also during the pre-localization.

The illumination light is in particular excitation light, which excites the emitters to fluorescence. The excitation to fluorescence is an example of inducing the light emission by the illumination light. Alternatively, the illumination light may also modulate, e.g., inhibit, the light emission. In particular, examples include STED light, which depopulates the excited state of fluorophores through stimulated emission depletion, and switching light, which can, for example, convert fluorophores from the excited state to a dark state, such as a triplet state. Therein, illumination light that modulates light emission is used, in particular in the main localization, further in particular in combination with excitation light. In the pre-localization, in particular, only excitation light is used as illumination light.

In the main localization, the sample is illuminated with an intensity distribution of the illumination light that comprises a local minimum. Therein, the local minimum is located in particular at the geometric focus of the illumination light in the sample and is ideally formed as an intensity zero position. The local minimum is surrounded by intensity increasing regions in at least one spatial direction and may be point-shaped, i.e. surrounded by intensity increasing regions in two or three spatial directions. In particular, the intensity distribution may be a 2D donut or a 3D donut (also referred to as a bottle beam). Alternatively, the local minimum may be extended along a line or a plane, i.e., extended along a first spatial direction and surrounded by intensity increasing regions in a further second spatial direction (which is in particular perpendicular to the first spatial direction). An intensity distribution with a zero position extending along a plane may be generated, for example, by modulating a linearly polarized light beam with a segmented phase pattern with a phase jump of $\pi$. For phase modulation of the illumination light, in all cases described above, a phase plate or a so-called spatial light modulator (SLM) may be used, for example. Corresponding methods are known from the prior art for STED and MINFLUX microscopy. Due to the intensity distribution with the local minimum, the position determination for the main localization may be carried out according to the MINFLUX principle, i.e. it is exploited that the light emissions of an individual emitter are the smaller the closer the emitter is to the local minimum.

The illumination positions are the positions where the local minimum of the illumination light is located. The local minimum is positioned at these positions during the main localization, in particular one after the other, and the corresponding light emissions are detected. If the local minimum is positioned in a temporal sequence at the illumination positions, a fixed sequence of the illumination positions may be passed through once or several times. Alternatively, a variable or even random sequence of the illumination positions is also possible. The movement of the local minimum relative to the sample may be step-wise or continuous. In the case of a continuous movement, the assignment of the detected light emissions to an illumination position may be done in a similar way as in continuous scanning in scanning microscopy, e.g., by defining corresponding time intervals (so-called dwell times) and assigning the light emissions to an average illumination position during the corresponding time interval. The shifting of the local intensity minimum relative to the sample may be realized in particular by beam displacement (e.g., electrooptically or by means of a galvanometric scanner), sample displacement (e.g., by means of a sample holder movable with a piezoelectric actuator) or by controlling certain point light sources such as fiber ends of an optical fiber.

One-dimensional localization of the emitter requires at least two spaced apart illumination positions. Two-dimensional localization of the emitter requires at least three illumination positions in a plane perpendicular to the optical axis of the illumination light (focal plane), and three-dimensional localization requires at least four illumination positions, of which at least two illumination positions are spaced along the optical axis (i.e., not both are in the focal plane). However, significantly more illumination positions may also be used, as is known, for example, from the so-called RASTMIN technique.

The light emissions of the emitter are detected by means of a detector, e.g., by means of a point detector (such as an avalanche photodiode, APD, a photomultiplier or a so-called hybrid detector) or an area detector with several detector elements or pixels (e.g., a CCD or CMOS camera or an APD array). In the case of an area detector, the individual detector elements may be separately readable. During the detection of the light emissions, in particular individual emitted photons may be registered, particularly time resolved. Evaluation electronics (e.g., a so-called TCSPC module) may be provided for this purpose. APDs with the possibility of single photon counting are also called SPADs (single photon avalanche photodiodes). When single photons are registered, a photon rate may be calculated, for example, which serves as a measure for the light emission of the emitter.

The same detector may be used to detect light emissions in the pre-localization and the main localization, or different detectors may be used, e.g., a camera for the pre-localization and a point detector or an array of photodiodes for the main localization.

Estimating the position of the emitter in the pre-localization may be performed in several ways. For example, if the pre-localization uses a detector with multiple detector elements for position-dependent detection of light emissions in the detection plane, the position estimation may be done by determining a two-dimensional intensity histogram and determining the centroid of this histogram or by a moment determination (in particular the first moment of the distribution of light intensities). If the sample is scanned with a (e.g., Gaussian) focus of illumination light during pre-Hi localization, the position can be determined based on the scan position for which a maximum light emission results.

For the position determination according to the MINFLUX principle in the main localization, a position estimator is used in particular. For example, estimators known from the prior art may be used (see e.g., "Balzarotti F, Eilers Y, Gwosch K C, Gynna A H, Westphal V, Stefani F D, Elf J, Hell S W. Nanometer resolution imaging and tracking of fluorescent molecules with minimal photon fluxes. Science. 2017 Feb. 10; 355(6325):606-612").

The maximum extension (which is defined in particular by the diameter of a circle in the case of a polygonal illumination pattern and by the length and/or width of the grid area in the case of a Cartesian grid) is chosen to be as small as possible, in particular, because the localization accuracy of the position determined in the main localization depends on this maximum extension. At the same time, however, the maximum extension must be chosen large enough to ensure that the emitter to be localized is located with high probability in a catch range of the localization method. The catch range is the area in which the emitter must be located in order to be unambiguously localized by the method. In particular, this means that a maximum likelihood position estimator that can be used for the corresponding localization method has a unique maximum if the emitter is located in the catch range. In particular, the size of the catch range may also depend on the type of detection of emitted light used. For example, the catch range may be increased by a detector with several detector elements arranged in a detection plane.

According to one embodiment, the method according to the present disclosure is carried out several times for different emitters, wherein the position of the emitters is determined one after the other, and wherein an image of structures of the sample is generated from the determined positions.

According to one embodiment, the illumination positions of the illumination pattern remain constant relative to each other during the first iteration and the at least one second iteration (i.e., in particular, throughout the main localization), with the illumination pattern being repositioned at the beginning of each of the at least one second iteration, so that the illumination positions of the illumination pattern are arranged around the position determined in the respective preceding iteration. In this embodiment, therefore, a constant illumination pattern may be generated, which has the advantage that the method can be realized with a simpler light microscope, in particular without beam displacement means such as EODs and with simpler control electronics without adaptation of the illumination pattern.

According to one embodiment, the illumination light is excitation light which induces the light emissions of the emitter. Thus, as in the originally described MINFLUX method, the sample is illuminated with an intensity distribution of excitation light with a local minimum, in particular a zero.

According to a further embodiment, the maximum extension of the illumination pattern is set or fixed depending on a position uncertainty of the position estimated in the pre-localization. The larger the position uncertainty of the position estimated in the pre-localization, the larger the maximum extension should be selected to ensure that the emitter is located in the catch range with a high probability.

According to a further embodiment, the position uncertainty is determined from the detected light intensities, wherein the maximum extension of the illumination pattern is set according to the determined position uncertainty. The position uncertainty is determined, in particular automatically, by means of a computing unit coupled to or integrated in the light microscope. In particular, the position uncertainty is determined from a number of photons emitted by the emitter registered in the pre-localization. In camera-based localization methods (e.g., PALM/STORM and related methods), the more photons detected by an emitter, the lower the position uncertainty. If this position uncertainty is expressed, e.g., as the standard deviation of a spatial coordinate, it is inversely proportional to the square root of the total photon number. Furthermore, for camera-based methods, the position uncertainty also depends on the pixel size, the background, and the width of the point spread function. As a lower bound of the position uncertainty, the so-called Cramer-Rao lower bound may be used, i.e., the best possible localization precision with any unbiased position estimator.

According to a further embodiment, the maximum extension of the illumination pattern is fixed to a predetermined value, wherein the pre-localization is performed to yield a value of positional uncertainty to which the predetermined value of maximum extension is assigned. The predetermined value of maximum extension may be fixed by apparatus, for example by using an optical fiber having a plurality of fiber ends arranged in a pattern. Alternatively, the value of the maximum extension may be variable in principle but fixed for one main localization or a group of main localizations at a time.

According to a further embodiment, the steps of the pre-localization are repeated or a time interval during which the pre-localization is performed is adjusted until the position uncertainty of the estimated position falls below a predetermined or predeterminable threshold.

According to a further embodiment, the maximum extension is set according to the condition $L=\alpha \cdot \sigma_r$ where L denotes the maximum extension, wherein $\sigma_r$ denotes the position uncertainty of the position estimated in the pre-localization, and wherein $\alpha$ denotes a proportionality factor, in particular wherein the position uncertainty is a standard deviation or a variance of a localization distribution of the emitter. In particular, the proportionality factor a is greater than zero.

According to a further embodiment, the proportionality factor has a value in the range of 1 to 3. That is, the proportionality factor is in particular one to three times the standard deviation of the localization distribution.

According to a further embodiment, a position uncertainty of the position estimated in the pre-localization is 100 nm or less, in particular 50 nm or less, further in particular 20 nm or less, further in particular 10 nm or less. According to a further embodiment, the maximum extension of the illumination pattern is 100 nm or less, in particular 50 nm or less.

According to a further embodiment, the illumination positions are arranged on a scanning circle or a scanning sphere around the estimated position of the emitter or around the position of the emitter determined in the respective preceding iteration (i.e., the first iteration or the respective second iteration), with the maximum extension corresponding to the diameter of the scanning circle or the scanning sphere. Thereby, a 2D MINFLUX localization may be realized by an arrangement on a scanning circle with a suitable diameter, wherein the position accuracy of the localization depends on the diameter. In particular, illumination points on a scanning sphere may be used for 3D localization. Alternatively, in the 3D case, the illumination positions may also be arranged on a scanning ellipsoid, in which case the maximum extension is defined by the length of the longer major axis of the ellipsoid.

According to a further embodiment, the illumination pattern is a grid, in particular a Cartesian grid or a hexagonal grid. The term grid describes a two- or three-dimensional regular arrangement of illumination points covering an area of the sample. In particular, adjacent illumination points are equally spaced. A Cartesian grid of illumination points is used, for example, in the so-called RASTMIN technique.

According to a further embodiment, a total photon number of photons to be registered is determined for the emitter, wherein the total photon number is divided into a first photon number and a second photon number, and wherein the position of the emitter in the pre-localization is estimated when the light emissions detected in the pre-localization reach the first photon number.

In this way, the position of an emitter can be determined in a particularly photon-efficient manner, taking advantage of certain benefits of pre-localization with high positional accuracy. For example, the pre-localization may be particularly fast so that a desired combination of speed and accuracy can be achieved by dividing the photon budget.

According to a further embodiment, the position of the emitter in the main localization is determined when the light emissions detected in the main localization reach the second photon number.

According to a further embodiment, the position estimated in the pre-localization comprises a greater position uncertainty than the position of the emitter determined in the main localization.

According to a further embodiment, the estimation of the position of the emitter in the pre-localization is performed with a non-iterative method. Thus, the position is estimated only once within a pre-localization after exposure to the illumination light and detection of the light emissions. In particular, this means that, unlike, for example, iterative MINFLUX methods described in the prior art, the illumination of the sample with an adapted illumination pattern is not repeated after a first position estimate in order to refine the position estimate. This reduces the computational effort and increases the speed of the method.

According to a further embodiment, the sample is scanned in the pre-localization with a focus or an intensity minimum of the illumination light, in particular wherein a scanning image of the sample is generated. In this case, a scanning image is an image with pixels, wherein each pixel is assigned a light intensity detected for a specific position of the focus or the minimum.

According to a further embodiment, a wide-field image of the sample is generated in the pre-localization. A wide-field image is an image obtained by a substantially homogeneous illumination of the sample with the illumination light and, in particular, a detection of light emissions from emitters in the sample with a detector having multiple detector elements, such as a camera.

According to a further embodiment, the positions of a plurality of emitters are estimated in the pre-localization, in particular using a stochastic localization method, wherein a first emitter is selected from the plurality of emitters, and wherein the position of the first emitter is determined in the main localization. For this purpose, for example, a detector with multiple detector elements, such as a camera, may be used. In particular, the positions of the multiple emitters are thereby estimated using a stochastic localization method. In this context, the term "stochastic localization method" refers to a method in which a localization map of the particles is generated from a plurality of localizations of individual particles in the sample with a resolution below the diffraction limit (so-called Abbe limit, which is determined by the wavelength of the light and the numerical aperture of the objective), wherein the particles or emitters coupled to the particles change stochastically between an emitting state and a non-emitting state. In particular, the conditions are set so that those particles or emitters that are each in the emitting state in a localization have a distance above the diffraction limit. The stochastic transition between the non-emitting state and the emitting state may be induced, for example, by illuminating the sample with activation light as known from the so-called PALM technique (photoactivated localization microscopy). Alternatively, the chemical conditions in the sample may be adjusted so that the particles or emitters blink at a desired frequency, i.e., spontaneously switch between the emitting and the non-emitting state. This is exploited, for example, in the so-called dSTORM (direct stochastic optical reconstruction microscopy) technique and in the SOFT (superresolution optical fluctuation imaging) technique, the latter of which particularly uses an autocorrelation function to separate individual emitters from each other in data analysis. In particular, the first emitter is automatically selected from the multiple emitters. Alternatively, manual selection by a user of the light microscope is also possible. The selection may be random or may be made according to a predetermined criterion. Such a criterion may be, in particular, the number of photons detected and registered for the respective emitter, which determines, among other things, the position uncertainty.

According to a further embodiment, the light emissions of the emitter are detected during the pre-localization with a detector comprising a plurality of detector elements, in particular a camera or an array of photodiodes (e.g., an APD array). In this case, the detector elements detect the light emissions, in particular in a position-dependent manner, in a detection plane. The detection plane is in particular confocal to a focal plane in the sample containing a geometric focus of the illumination light, i.e., the detection plane is an image plane with respect to the focal plane in the sample. In particular, the detector elements of the detector are individually readable.

Detection of light emissions with the detector, which comprises a large number of detector elements, during pre-localization allows relatively fast position estimation with sufficient accuracy (which can be adjusted by the number of photons detected) to subsequently perform a main localization in several iterations with a fixed maximum extension of the illumination pattern.

According to another embodiment, the position of the emitter estimated during pre-localization is determined using a position estimator, such as a least-mean-square estimator or a maximum-likelihood estimator, based on light emissions detected by the detector elements.

According to a further embodiment, the position of the emitter estimated during pre-localization is determined by a moment determination, in particular by determining the first moment (in particular a weighted average) of a light intensity distribution, based on the light emissions detected by the detector elements.

According to a further embodiment, a function is fitted to data obtained from light emissions detected by the detector elements, wherein the position estimated during pre-localization is determined from the fitted function. For example, a function fit of the data to a two-dimensional Gaussian function may be performed, adjusting the position of the maximum and the width of the Gaussian function until the deviation of the data from the function reaches a minimum.

According to a further embodiment, a centroid of a distribution of light emissions detected by the detector elements (i.e., in particular, a spatial distribution in the detection plane) is determined, wherein the position of the emitter is estimated based on the centroid.

According to a further embodiment, the light emissions of the emitter are detected during the main localization with a detector comprising a plurality of detector elements, in particular an array of photodiodes. In particular, the detector elements detect the light emissions in a position-dependent manner in a detection plane. The detection plane is in particular confocal to a focal plane in the sample containing a geometric focus of the illumination light, i.e., the detector elements are arranged in an image plane associated with the focal plane. In particular, the detector elements of the detector are individually readable.

This has the advantage that the catch range of the localization (i.e., the range in which an emitter to be localized must be located so that it can be localized unambiguously with the MINFLUX method described above) is extended by the additional information of the position-resolved detection. In this way, localization of the emitter with the method according to the present disclosure is possible even if the actual position of the emitter lies outside the illumination pattern.

According to a further embodiment, single photons emitted by the emitter and detected by the detector elements of the detector used in the pre-localization and/or the main localization are registered. For this purpose, for example, an electronic evaluation unit such as a so-called TCSPC (time correlated single photon counting) module may be used.

According to one embodiment, light emissions during pre-localization are detected with a detector comprising a plurality of detector elements, wherein light emissions during main localization are detected with a point detector (e.g., an avalanche photodiode (APD), a photomultiplier, or a hybrid detector).

According to a further embodiment, the light emissions are detected with a point detector during the pre-localization, wherein the light emissions are detected with a detector comprising a plurality of detector elements during the main localization. In particular, the detector elements may be individually readable, further in particular wherein the detector elements are configured to register individual photons emitted by the emitter and detected by the detector elements, further in particular wherein the detector comprising the plurality of detector elements is an array of photodiodes.

According to a further embodiment, the light emissions are detected with a first detector comprising a plurality of detector elements during the pre-localization, wherein the light emissions are detected with a second detector comprising a plurality of detector elements during the main localization. In particular, the first detector is a camera and/or the second detector is a detector comprising individually readable detector elements, further in particular wherein the detector elements are configured to register individual photons emitted by the emitter and detected by the detector elements, further in particular wherein the second detector is an array of photodiodes (e.g., a SPAD array).

According to a further embodiment, the arrangement of the illumination positions is fixed by at least one light source and/or by an illumination optics during the localization of the emitter, in particular during the main localization. "Fixed" in this context means, in particular, that the relative positioning of the illumination positions with respect to each other is fixed, but that a displacement of an illumination pattern formed by the illumination positions with respect to the sample is possible.

In particular, this has the advantage that the sample may be illuminated at the illumination positions with the local minimum of the intensity distribution of the illumination light without fast beam deflection devices, such as electro-optical deflectors. Thus, a less complex and less expensive MINFLUX microscope can be realized. The method according to the present disclosure is particularly well suited for the use of a fixed illumination pattern, since the position determination is carried out according to the MINFLUX principle without an adjustment of the size of the illumination pattern.

According to a further embodiment, the sample is illuminated with the illumination light at the illumination positions via respective point light sources. The point light sources may be realized via separate light sources (e.g., lasers), or the light of a light source may be split to form the point light sources, e.g., via an arrangement of beam splitters, via, in particular individually controllable and movable, micromirrors or by coupling the light of a light source into several optical fibers.

According to a further embodiment, the point light sources are formed by respective fiber ends of optical fibers from which the illumination light emerges.

According to a further embodiment, at least two groups of optical fibers are provided, wherein the maximum extension of the illumination pattern is adjusted by a selection of one of the groups. In particular, one of the groups is selected in the main localization depending on the position uncertainty of the position estimated in the pre-localization, wherein the sample is illuminated in the main localization by means of the selected group of optical fibers at the illumination positions, so that the maximum extension of the illumination pattern is adjusted by the selection of the group. For example, the groups of optical fibers may be arranged concentrically around a common center of a fiber bundle.

This embodiment has the advantage that the maximum extension of the illumination pattern can be easily changed without beam deflection units, such as electro-optical deflectors, and without an adjustment of optical components (e.g., an adjustable telescope optics).

According to a further embodiment, the point light sources are formed by reflecting an input light beam at one or more micromirrors of a micromirror array. Such micromirror arrangements, e.g., so-called digital mirror devices, DMD, allow a very flexible splitting and targeted deflection of an input light beam.

According to a further embodiment, the illumination positions, in particular the illumination pattern, are adjustable between different main localizations, in particular by adjusting a magnification factor, further in particular by selecting or changing an objective or by adjusting a zoom optics, by adjusting a micromirror arrangement or by selectively using different optical fibers, in particular of a fiber bundle.

According to a further embodiment, the sample is illuminated by means of light pulses of the illumination light, with successive light pulses being assigned to different illumination positions. The latter embodiment may also be referred to as pulse-interleaved illumination. In this variant of the method, the sample is illuminated in particular at illumination positions of an illumination pattern through a fiber end of a respective optical fiber. Therein, the laser beam of a pulsed laser may be divided among various optical fibers of different lengths in order to achieve the desired time delay of the light pulses. In this case, the laser beam may be split before coupling into the optical fibers, e.g., by means of beam splitters. During the main localization, the exposure of the sample at the illumination positions is then carried out, in particular repeatedly, i.e., the pulse sequence is passed through several times in order to obtain a sufficient number of emitted photons. In this context, the term "light pulses" refers to quantities of light that propagate from a light source at specific time intervals, while no light is emitted from the light source between the time intervals. The light pulses may be periodic or aperiodic, i.e., occurring at regular or irregular intervals. Further, the term "light pulse" as used in the context of this disclosure is not limited to any particular time scale.

A second aspect of the method relates to a light microscope for localizing individual emitters in a sample, in particular according to the method according to the first aspect, comprising at least one light source and/or illumination optics configured to illuminate the sample with illumination light, wherein the illumination light induces or modulates light emissions from an emitter in the sample, a light modulator configured to generate an intensity distribution of the illumination light or of another illumination light in the sample, the intensity distribution comprising a local minimum, at least one detector configured to detect light emissions from the emitter, a computing unit configured to estimate and/or determine a position of the emitter in the sample from detected light emissions, a control unit configured during a pre-localization to control the light source and/or the illumination optics such that the light source and/or the illumination optics illuminate the sample with the illumination light, to control the detector such that the detector detects the light emissions of the emitter, and to control the computing unit such that the computing unit estimates the position of the emitter in the sample from the detected light emissions, and during a subsequent main localization, to control the light source and/or the illumination optics and/or the light modulator such that the light source and/or the illumination optics illuminate the sample with an intensity distribution of the illumination light or another illumination light at illumination positions, the intensity distribution comprising a local minimum, wherein in a first iteration the illumination positions are arranged around the position of the emitter estimated in the pre-localization and wherein in at least one second iteration performed after the first iteration the illumination positions are arranged around the position of the emitter determined in the preceding iteration, the illumination positions in the first iteration and the at least one second iteration forming a respective illumination pattern comprising a maximum extension, wherein the maximum extension of the illumination pattern is constant during the main localization, to control the detector or a further detector such that the detector or the further detector detects the light emissions of the emitter for the illumination positions, respectively, and to control the computing unit such that the computing unit determines the position of the emitter in the sample from the light emissions detected for the illumination positions.

In particular, the light source comprises one or more lasers.

The light modulator is in particular a phase plate or a so-called spatial light modulator with individually controllable pixels. In particular, the light modulator is configured to modulate a phase distribution of the illumination light, particularly in a plane conjugate to the pupil of the objective (i.e., a Fourier plane with respect to the image plane), so that the intensity distribution with the local minimum is obtained at the focus in the sample.

According to one embodiment of the light microscope, the detector comprises a plurality of, in particular individually readable, detector elements. In particular, the detector or an electronic evaluation unit coupled to the detector is configured to register individual photons emitted by the emitter and detected by the detector elements.

According to a further embodiment, the light microscope comprises a first detector which is configured to detect the light emissions of the emitter during the pre-localization, wherein the light microscope comprises a further second detector which is configured to detect the light emissions of the emitter during the main localization. In particular, both the first detector and the second detector comprise a plurality of detector elements, wherein further in particular the detector elements of the second detector are individually readable, and/or wherein further in particular the second detector is configured to register individual photons emitted by the emitter and detected by the detector elements of the second detector.

According to a further embodiment of the light microscope, the light source comprises a plurality of optical fibers, wherein the optical fibers comprise respective fiber ends, and wherein the optical fibers are configured to illuminate the sample via the fiber ends at respective illumination positions with illumination light coupled into the optical fibers.

According to a further embodiment, the optical fibers form a fiber bundle.

According to a further embodiment, the optical fibers are arranged symmetrically about a center of the fiber bundle in a plane perpendicular to a longitudinal extension direction of the fiber bundle.

According to a further embodiment, the light source or an illumination optics of the light microscope fixes the arrangement of the illumination positions during the localization of the emitter, in particular during the main localization. In particular, this means that the relative positioning of the illumination positions with respect to each other is fixed, but a shift of an illumination pattern formed by the illumination positions with respect to the sample is possible. In particular for this purpose, the light microscope may comprise, for example, a galvanometric scanner adapted to displace an illumination light beam or a plurality of illumination light beams of the illumination light relative to the sample.

According to a further embodiment, the light microscope comprises a plurality of point light sources, wherein the point light sources are configured to illuminate the sample at respective illumination positions with the illumination light. In particular, the light microscope comprises a plurality of light sources, such as lasers, wherein the light sources form respective point light sources. In particular, the light microscope comprises at least one beam splitter or an arrangement of micro mirrors, in particular individually controllable and movable micro mirrors, which is designed to split the light from the light source to form the point light sources. In particular, the fiber ends of the optical fibers alternatively form the point light sources.

According to a further embodiment, the light microscope comprises at least a first group of optical fibers and a second group of optical fibers, wherein the control unit is configured to select in the main localization, in particular depending on the position uncertainty of the position estimated in the pre-localization, the first group or the second group and to control the light source and/or the illumination optics such, that the sample is illuminated according to the selection in the main localization either by means of the first group of optical fibers at first illumination positions forming a first illumination pattern with a first maximum extension, or by means of the second group of optical fibers at second illumination positions forming a second illumination pattern with a second maximum extension different from the first maximum extension. For example, the first and second groups of optical fibers may be arranged concentrically about a common center of a fiber bundle.

According to a further embodiment, the light microscope comprises a first group of optical fibers and a second group of optical fibers, wherein the optical fibers of the first group comprise a first minimum distance from a center of the fiber bundle in a plane perpendicular to a longitudinal extension direction of the fiber bundle, and wherein the optical fibers of the second group comprise a second minimum distance from the center that is different from the first minimum distance.

According to a further embodiment, the light microscope comprises a micromirror array comprising a plurality of micromirrors, wherein the point light sources are formed by reflecting an input light beam from one or more of the micromirrors.

According to a further embodiment, the control unit of the light microscope is configured to control an objective nose-piece, zoom optics, the micromirror array or the optical fibers such that the illumination positions, in particular the illumination pattern, are or is adjustable between different main localizations, in particular by adjusting a magnification factor.

According to a further embodiment, the light source comprises a pulsed laser that is configured to illuminate the sample by means of light pulses of the illumination light, in particular with successive light pulses being assigned to different illumination positions. In particular, the light microscope is configured in such a way that the light pulses are coupled into optical fibers of different lengths, the optical fibers being designed to illuminate the sample at respective illumination positions. In particular, the term pulse laser also includes devices in which a continuous laser light source is combined with a pulse generation device (e.g., based on an AOM).

According to a further embodiment, at least some of the optical fibers have different lengths. In particular, all optical fibers may have different lengths. If several groups of optical fibers are provided, in particular the optical fibers of a respective group may have different lengths. If laser pulses are coupled into the optical fibers of such a fiber bundle, pulse-interleaved illumination may be realized in a simple manner at the illumination positions.

A third aspect of the present disclosure relates to a non-transitory computer-readable medium for storing computer instructions for localizing individual emitters in a sample that, when executed by one or more processors associated with a light microscope, causes the one or more processors to perform a method according to the first aspect.

A fourth aspect of the present disclosure relates to the use of a fiber bundle comprising a plurality of optical fibers in a method according to the first aspect, wherein the sample is illuminated with the illumination light via respective fiber ends of the optical fibers at the illumination positions.

According to a further embodiment, the optical fibers are arranged symmetrically about a center of the fiber bundle in a plane perpendicular to a longitudinal extension direction of the fiber bundle.

According to an embodiment of the fourth aspect, the fiber bundle comprises a first group of optical fibers and a second group of optical fibers, wherein the optical fibers of the first group comprise a first minimum distance from a center of the fiber bundle in a plane perpendicular to a longitudinal extension direction of the fiber bundle, and wherein the optical fibers of the second group comprise a second minimum distance from the center that is different from the first minimum distance. In particular, the groups of optical fibers are arranged concentrically around the center. Such arrangements make it possible to selectively couple the illumination light into the groups of optical fibers, and thus to adjust the maximum extension of the illumination positions from the position estimated in the pre-localization.

According to a further embodiment of the fourth aspect, at least some of the optical fibers have different lengths. In particular, all optical fibers may have different lengths. If several groups of optical fibers are provided, in particular the optical fibers of a respective group may have different lengths. If laser pulses are coupled into the optical fibers of such a fiber bundle, pulse-interleaved illumination may be realized in a simple manner at the illumination positions.

Further features of the light microscope according to the second aspect, the computer program according to the third aspect result and the use according to the fourth aspect result from the features of the method according to the first aspect described above.

Advantageous further embodiments of the present disclosure result from the claims, the description and the drawings and the associated explanations to the drawings. The described advantages of features and/or combinations of features of the present disclosure are merely exemplary and may have an alternative or cumulative effect.

In the following, embodiments of the present disclosure are described with reference to the figures. These do not limit the subject matter of this disclosure and the scope of protection.

BRIEF DESCRIPTION OF THE FIGURES

FIG. 1A to FIG. 1C schematically shows an embodiment of the method according to the present disclosure;

DESCRIPTION OF THE FIGURES

Figure 2:
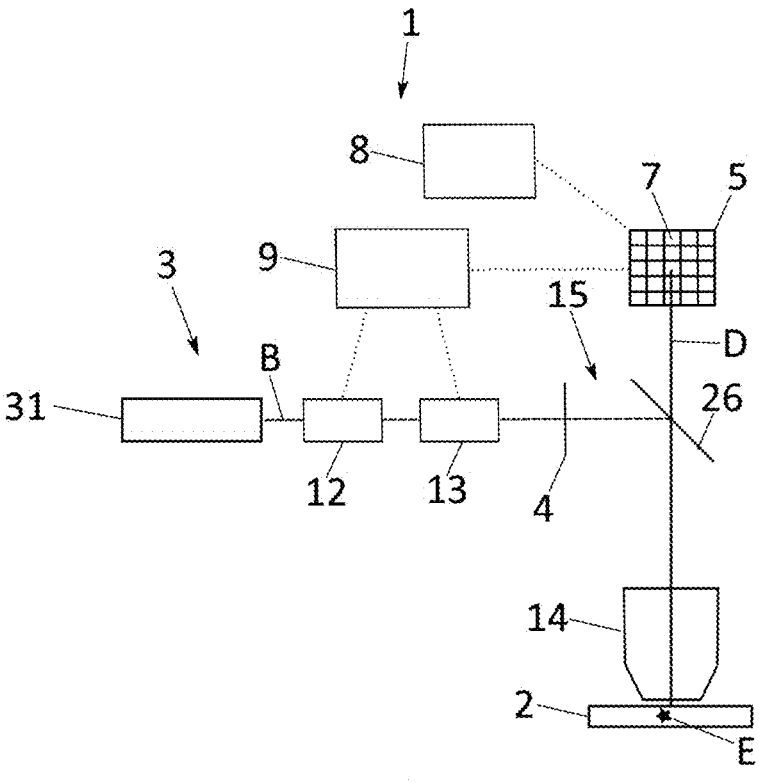
FIG. 2 shows a light microscope according to the present disclosure comprising a detector with multiple detector elements.

FIG. 1A to FIG. 1C schematically shows the sequence of an exemplary method according to the present disclosure for localizing an individual emitter E, e.g., a single molecule labeled with a fluorescent dye, in a sample 2. The emitter E emits fluorescent light (light emissions D) when the sample 2 is irradiated with illumination light B (here excitation light). To excite the fluorescent dye, the sample 2 may be illuminated with the illumination light B, for example, by means of a wide-field illumination.

The position of the emitter E is first estimated in a pre-localization (FIG. 1A). For this purpose, the light emissions D are detected by the detector elements 7 of a detector 5 in a position-dependent manner in a detection plane. The detector 5 may be, for example, a camera (such as a CCD camera or a CMOS camera) that detects light intensities of the light emitted by the emitter in a position-dependent manner. These light intensities are shown in FIG. 1A in the form of gray scales assigned to the individual detector elements 7. From the light intensities, the position S of the emitter E in the sample 2 may be estimated with the aid of a computing unit 8 (see FIG. 2-3), e.g. (as known from PALM/STORM microscopy) by determining a centroid of the light intensity distribution on the detector 5, by a fit of a two-dimensional Gaussian distribution to the light intensity distribution, by using a maximum likelihood position estimator or by moment determination.

In a subsequent main localization (FIG. 1B and FIG. 1C), the position of the emitter in the sample 2 is then determined with high accuracy according to the MINFLUX principle. For this purpose, the sample 2 is illuminated with an intensity distribution I of the illumination light B (here the excitation light) with a local minimum M (e.g., a 2D donut or a 3D donut). The local minimum M is thereby placed, in particular successively, at illumination positions 10 in the sample 2, which form an illumination pattern 11.

In a first iteration step (FIG. 1B), a symmetrical hexagonal illumination pattern 11 is arranged around the position S estimated in the pre-localization. For each illumination position 10, the light emissions D of the emitter E are detected, in particular wherein single photons are registered. Then, by means of a computing unit 8 of the light microscope 1, the position of the emitter E is determined from the light emissions D detected and registered for the individual illumination positions 10, e.g., using a maximum likelihood position estimator.

This is followed by at least one further second iteration step (FIG. 1C), in which the illumination pattern 11 is arranged around the position of the emitter E determined in the preceding iteration step (in this case, the first iteration step) of the main localization, and in which a determination of the position of the emitter E is again performed on the basis of the detected light emissions D. This position determination becomes more accurate with each iteration step, since the positions determined in the preceding iterations are taken into account by centering the illumination pattern 11.

In the method shown in FIG. 1A to FIG. 1C, in contrast to iterative MINFLUX methods in the prior art, a constant illumination pattern 11 is used, i.e., the illumination pattern 11 as a whole is shifted, in particular in each iteration step, but the illumination positions 10 are not changed relative to each other. This has the advantage that simpler and slower beam displacement means can be used, and the method can in particular be implemented without electro-optical deflectors. Of course, the method according to the present disclosure can also be realized with a MINFLUX microscope with electro-optical deflectors. Among other things, this has the advantage that the control electronics for carrying out the localization method can be designed more simply than with prior art methods, since no adaptive adjustment of the maximum extension L of the illumination pattern 11 is necessary.

The illumination positions 10 form an illumination pattern 11 with a maximum extension L and, in the example shown in FIG. 1A to FIG. 1C, are located on a scanning circle A around the estimated position S or the previously determined position. Therein, the maximum extension L is equal to the diameter of the scanning circle A. In particular, the size of the intensity distribution I is not shown to scale in comparison to the size of the scanning circle A.

If there is a possibility to set the maximum extension L, it can be set or fixed depending on a position uncertainty GR of the position S estimated in the pre-localization before the main localization (wherein the maximum extension L is constant). In particular, the more uncertain the position estimate is, the larger the maximum extension L is. By appropriately tuning the maximum extension L to the position uncertainty GR of the pre-localization, the emitter E is more likely to remain in the catch range during the main localization, i.e., it can be unambiguously localized.

The dependence between position uncertainty GR and maximum extension L results from the fact that the area in sample 2 in which emitter E is actually located with a certain probability is larger, the more uncertain the position estimate in the pre-localization. The catch range of the main localization (MINFLUX localization) must then be at least as large as the range in which the emitter E is located with given probability. A larger catch range can be achieved by a larger maximum extension L of the illumination pattern 11.

The position uncertainty GR can be adjusted in particular for the pre-localization, but also for the main localization, by the number of photons detected and registered (the more photons are detected and registered, the lower the position uncertainty $\sigma_R$). Therefore, in the method according to the present disclosure, in particular a photon budget can be divided between the pre-localization and the main localization in order to obtain a desired accuracy with the MINFLUX method.

The position uncertainty GR may be determined from data obtained in the pre-localization and the maximum extension L may be set based on the determined position uncertainty GR. Alternatively, the maximum extension L may be determined first and the pre-localization can then be performed to obtain a desired position uncertainty GR matching the maximum extension L, e.g., by detecting and registering a certain number of photons.

FIG. 2 shows an embodiment of a light microscope 1 for localizing an individual emitter E in a sample 2 according to the method of the present disclosure. The light microscope 1 is a MINFLUX microscope having a light source 3 with a laser 31 that generates an illumination light beam of illumination light B. The illumination light beam passes through a first beam deflection unit 12 and a second beam deflection unit 13, e.g. two electro-optical deflectors (EGDs) that form part of an illumination optics 15 and deflect the illumination light beam in a first direction and a second direction orthogonal to the first direction, respectively, in a plane extending perpendicular to a propagation direction of the illumination light beam (also referred to as x-direction and y-direction), when the first beam deflection unit 12 and the second beam deflection unit 13 receive a corresponding control signal from the control unit 9.

Furthermore, the illumination light beam is modulated, in particular phase modulated, by a light modulator 4 of the illumination optics 15 to generate an intensity distribution I with a local minimum M (in particular a 2D donut or a 3D donut) at the focus in the sample 2. The light modulator 4 may be transmitted by the illumination light beam, as exemplified in FIG. 2. Alternatively, the illumination light beam may be diffracted by a diffraction grating of the light modulator 4 or reflected from a surface of the light modulator 4 and thereby phase modulated.

The illumination optics 15 further comprises a dichroic beam splitter 26 that reflects the phase-modulated illumination light beam, and an objective 14 that focuses the illumination light beam into the sample 2.

The individual emitter E in the sample 2 excited by the illumination light B emits fluorescent light (light emissions D), which transmits the dichroic beam splitter 26 based on its wavelength and reaches a detector 5 of the light microscope 1. The detector 5 comprises a plurality of detector elements 7 arranged in a detection plane extending perpendicular to the direction of propagation of the light emissions D.

The individual detector elements 7 detect individual photons emitted by the emitter E, which are registered by a computing unit 8 of the light microscope 1 or the detector 5. The detector 5 may be, for example, a camera or a SPAD array.

When carrying out the method according to the present disclosure, the sample 2 is first illuminated with the illumination light B in order to carry out the pre-localization. For this purpose, for example, wide-field illumination of the sample 2 may be provided by means of the light source 3 or another light source (not shown). Alternatively, the sample 2 may be scanned with focused illumination light B during the pre-localization, e.g. by means of the first beam deflection unit 12 and the second beam deflection unit 13 or by means of a galvanometric scanner (not shown). Here, as in the subsequent main localization, the intensity distribution I with the local minimum M may be used, or the sample 2 may be scanned with a different light distribution, for example a regular, approximately Gaussian focus. In the latter case, it is advantageous if the light modulator 4 comprises individually controllable pixels in order to be able to switch between an intensity distribution I with local minimum M and a regular focus by changing the displayed phase pattern.

Optionally, activation light may be irradiated (focused or wide-field) simultaneously to or prior to illumination with the excitation light during pre-localization to activate photoactivatable fluorophores.

From the photons (light emissions D) detected during the pre-localization by the detector elements 7 of the detector 5 and registered by the computing unit 8, the computing unit 8 estimates the position S of the emitter E, e.g. by determining a centroid of a distribution of light intensities (or photon numbers) detected by the detector elements 7, as known e.g. from PALM/STORM microscopy. Alternatively, the position estimation by the computing unit 8 may be done, for example, by a fit of a Gaussian function to the light intensity distribution of the detected light or by means of a maximum likelihood estimator or by moment determination.

In the following main localization, the sample 2 is illuminated with the intensity distribution I with the local minimum M in several iteration steps at illumination positions 10, which are fixed for the main localization, but are arranged in each iteration step around the position of the emitter E determined in the preceding iteration step. Therein, the first beam deflection unit 12 and the second beam deflection unit 13 position the focus of the illumination light beam in the focal plane in the sample 2 at the illumination positions 10. For each illumination position 10, light emissions D are detected by the detector elements 7 of the detector 5. The computing unit 8 then determines the position of the emitter E from the light emissions D, e.g., by means of a maximum likelihood estimator.

Figure 3:
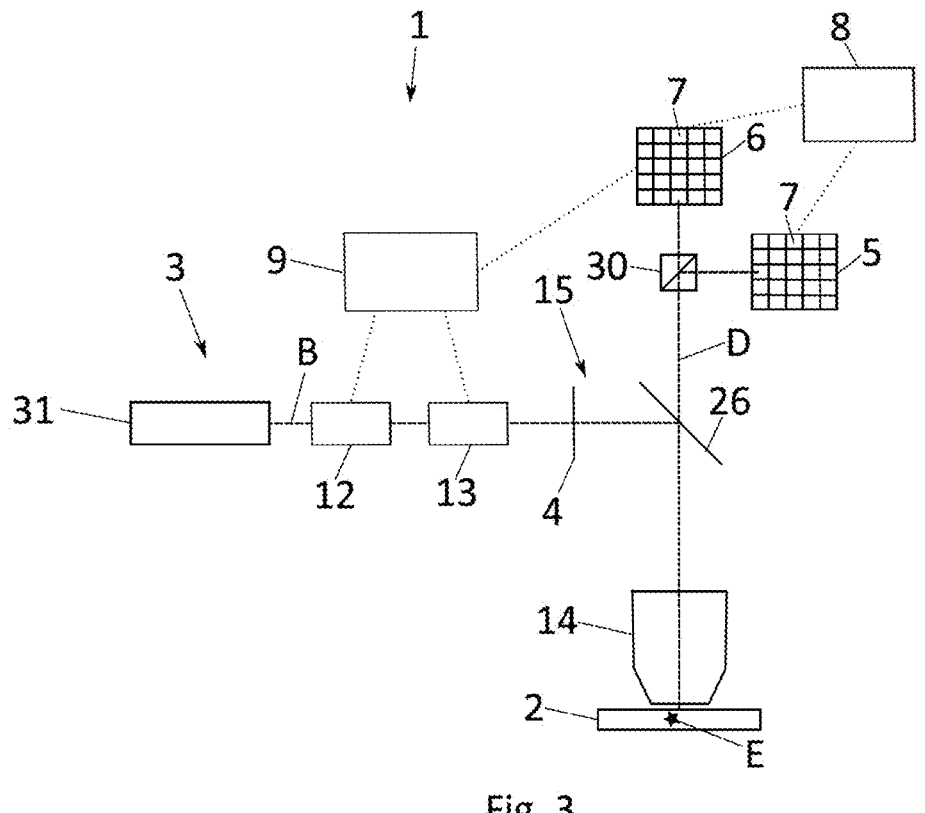
FIG. 3 shows a light microscope according to the present disclosure with two detectors, each with multiple detector elements.

FIG. 3 shows a further example of the light microscope 1 according to the present disclosure (MINFLUX microscope). It is constructed analogously to the light microscope 1 shown in FIG. 2 but comprises a first detector 5 and a second detector 6 in the detection beam path, each comprising a plurality of detector elements 7 arranged in a detection plane. Therein, the detection light, i.e., the light emissions D, are separated by a beam splitter 30. This may be a neutral beam splitter 30 which splits the detection light in a predetermined ratio (e.g., 1:1) irrespective of its properties. Alternatively, the beam splitter 30 may be, for example, a polarization beam splitter.

In this case, for example, a polarization switching element (not shown), e.g., a Pockels cell, can be arranged in front of the beam splitter 30 to selectively guide the detection light to the first detector 5 or the second detector 6 by a control signal depending on its polarization direction.

For example, the first detector 5 may be optimized for the pre-localization and the second detector 6 may be optimized for the main localization. The first detector 5 may be a CCD or CMOS camera, for example. In the context of the pre-localization, this has the advantage that individual emitters E can be localized relatively quickly in a relatively large image field. The second detector 6 may be a SPAD array. For the main localization according to the MINFLUX principle, this in particular has the advantage that single photon counting is possible for a MINFLUX localization with an extended catch range, i.e., that emitters E can be unambiguously localized in a larger area. This facilitates and improves in particular also the iterative localization according to the present disclosure by illumination of the sample 2 with a constant illumination pattern 11, which is repositioned in each iteration step, since here with a relatively small maximum extension L of the illumination pattern 11 a high position accuracy in the main localization can be achieved without risking that the emitter E to be localized gets out of the catch range and thus the measurement has to be aborted. In particular, the first iteration step can thus be performed by using a detector with multiple detector elements 7 with a much smaller maximum extension L than in prior art iterative MINFLUX methods.

Figure 4:
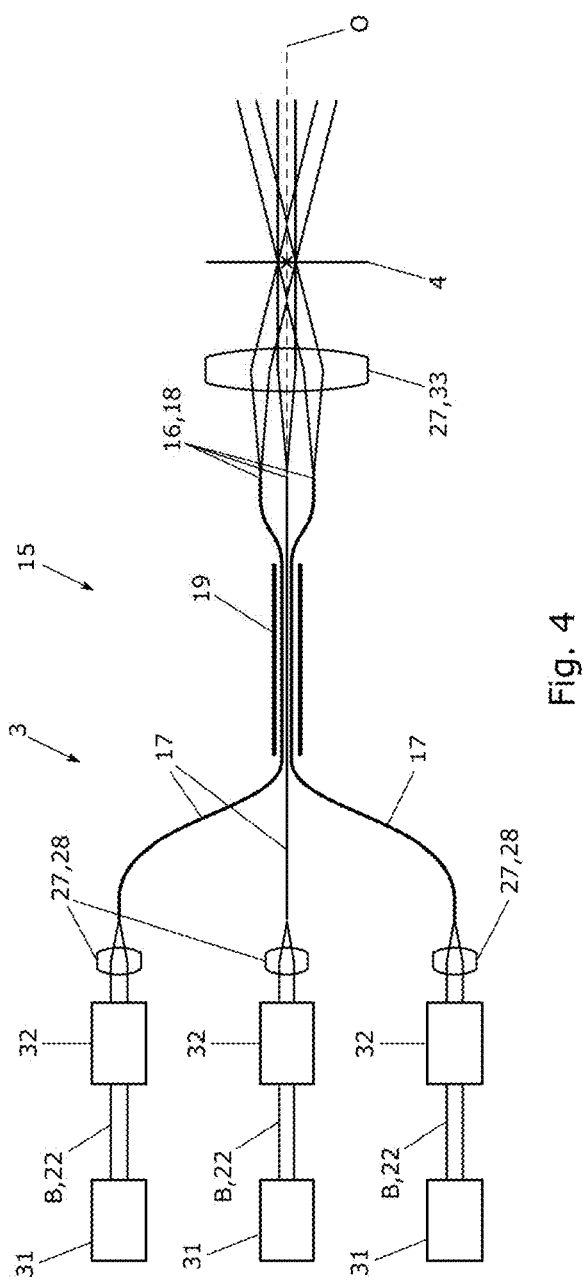
FIG. 4 shows a part of a light microscope according to the present disclosure comprising a fiber bundle.

FIG. 4 shows a part of a light microscope 1 for carrying out the method according to the present disclosure according to a further example, comprising a light source 3 comprising a plurality of point light sources 16 formed as fiber ends 18 of optical fibers 17 of a fiber bundle 19. The light source 3 comprises a plurality of lasers 31 for generating respective input light beams 22 of illumination light B, and a plurality of lenses 27 acting as fiber couplers 28 for coupling the input light beams 22 into respective optical fibers 17 of the fiber bundle 19. The light beams emerging at the fiber ends 18 of the optical fibers 17 then pass through an illumination optics 15, where they are jointly collimated and tilted with respect to each other by means of another lens 27 formed as a collimator 33. At the intersection of the collimated light beams, a light modulator 4 is arranged perpendicular to an optical axis O, which phase modulates the light beams by means of a phase pattern in order to generate a respective intensity distribution I with a local minimum M for each of the light beams at the focus in the sample 2. The light beams are then focused together by an objective 14 into the sample 2 (not shown in FIG. 4).

Between the lasers 31 and the fiber couplers 28, intensity modulators 32, e.g., acousto-optic modulators (AOM), can optionally be arranged to selectively modulate the intensity of input light beams 22 by the control unit 9, in particular in such a way that only one input light beam 22 is coupled into a respective optical fiber 17 at a time, while the other input light beams 22 are completely shadowed by means of the intensity modulators 32. In this way, the sample 2 can be illuminated successively at the illumination positions 10 with the illumination light B from the individual optical fibers 17.

Figure 5:
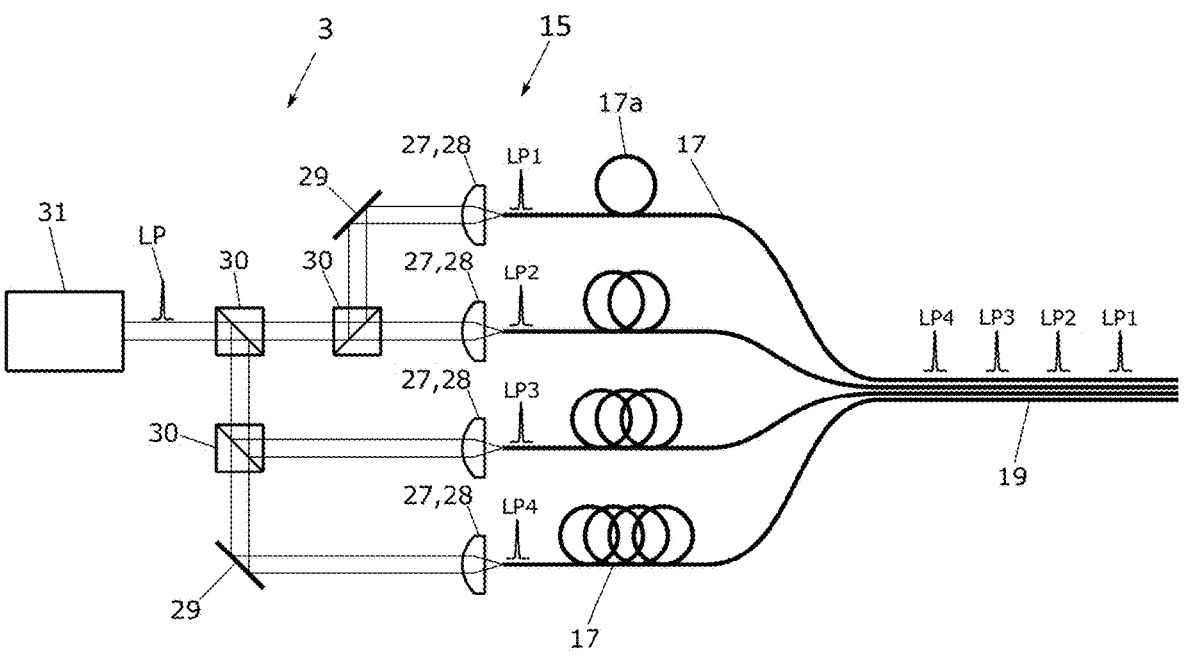
FIG. 5 shows an illumination beam path of another light microscope according to the present disclosure comprising a fiber bundle.

Another way of exposing the sample 2 to illumination light B from optical fibers 17 successively at the illumination positions 10 is shown in FIG. 5. Here, a single laser 31 designed as a pulse laser generates the illumination light B in the form of light pulses LP. The illumination light B is then split into different light beams by means of beam splitters 30 and mirrors 29, which are then coupled into respective optical fibers 17 of a fiber bundle 19 via lenses 27 designed as fiber couplers 28. The individual optical fibers 17 have different lengths, which is shown schematically in FIG. 5 by a different number of loops 17a. In this way, time-delayed light pulses LP1, LP2, LP3, LP4 are generated, which propagate through the respective optical fibers 17. The phase modulation of the light beams to generate temporally and spatially offset intensity distributions I with local minima M can be performed analogously to the setup shown in FIG. 4 by means of a light modulator 4 of an illumination optics 15, which is located at an intersection of mutually tilted collimated light beams generated by a common collimator 3 from the light emerging from the fiber ends 18.

Figure 6:
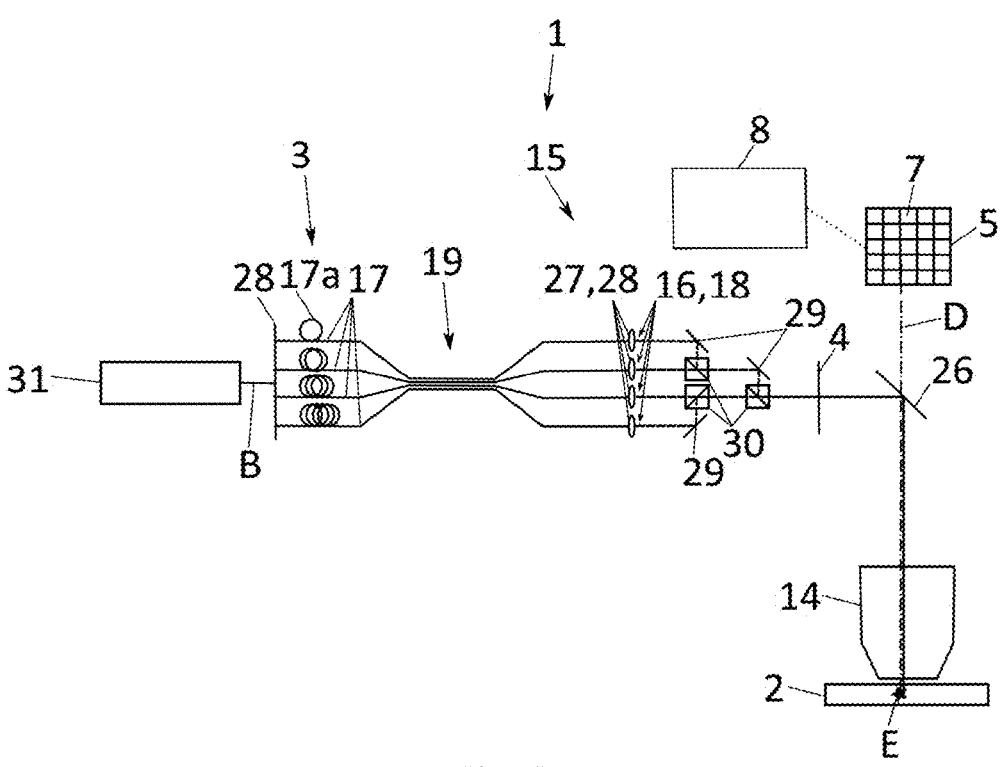
FIG. 6 shows another light microscope according to the present disclosure comprising a fiber bundle.

FIG. 6 shows another example of a light microscope 1 according to the present disclosure, which uses fiber ends 18 of optical fibers 17 as point light sources 16. Similar to the embodiment shown in FIG. 5, the light from a laser 31 configured as a pulsed laser is divided among a plurality of optical fibers 17 of different lengths (indicated by the loops 17a), in this case by means of a common fiber coupler 28. However, in contrast to this embodiment, the light emerging from the fiber ends 18 at lenses 27 configured as fiber couplers 28 is combined with beam splitters 30 and mirrors 29 of an illumination optics 15. The beam splitters 30 or mirrors 29 are located in particular in a pupil plane which is conjugate to the entrance pupil (rear aperture) of the objective 14. Thus, this plane is a Fourier plane with respect to the image plane (which is conjugate to the focal plane in the sample 2). In this case, the beam splitters 30 and mirrors 29 are adjusted so that the individual light beams are deflected at different angles at the reflecting surfaces of the beam splitters 30 and mirrors 29. This creates the desired lateral offset between the light beams in the focal plane to illuminate the sample 2 at the illumination positions 10. In this embodiment, the merged light beam is modulated jointly by means of a light modulator 4, which is also positioned in a plane conjugate to the pupil plane or at a small distance from this plane. Due to the optical fibers 17 of different lengths, a pulse sequence of light pulses LP of the illumination light B is created, as described above for the example shown in FIG. 5, so that the illumination positions 10 are illuminated with the illumination light B in a temporal sequence. In particular, the other components of the light microscope 1 are constructed analogously to the example shown in FIG. 1A to FIG. 1C and described further above. With respect to the construction and function of these components, reference is made to the corresponding parts of this figure description.

The examples of the light microscope 1 with optical fibers 17 shown in FIGS. 4 to 6 and described above are particularly well suited for the method according to the present disclosure, since they make it possible to illuminate the sample 2 in an apparatus-simple and robust manner with an illumination pattern 11 that is fixed for the main localization.

In particular, fast beam deflection devices such as electro-optical deflectors can be dispensed with and MINFLUX localization can still be performed with high positional accuracy using the method according to the present disclosure. The repositioning of the entire illumination pattern 11 between the iteration steps takes place on a much slower time scale than the control of the individual illumination positions 10 and can therefore be performed with much slower and less expensive scanning devices such as galvanometric scanners or piezoelectric actuators (on the sample stage or on the microscope stand).

Figure 7:
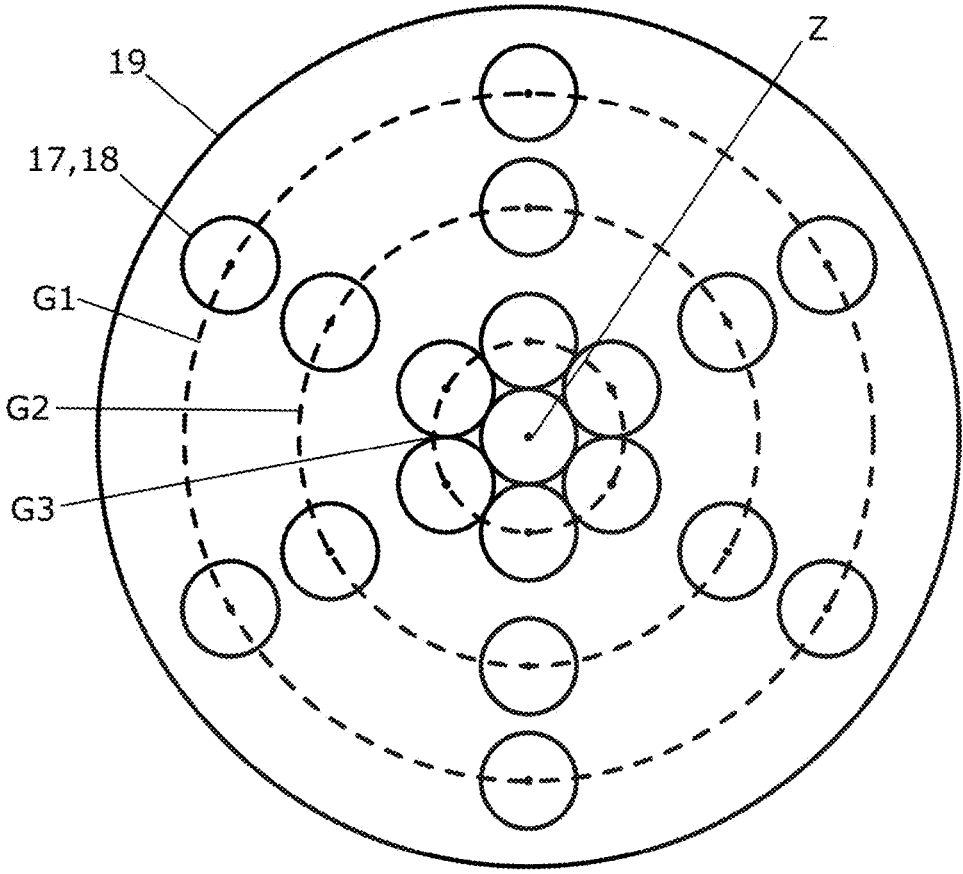
FIG. 7 shows another example of a fiber bundle comprises multiple concentric groups of optical fibers.

FIG. 7 shows an example of a fiber bundle 19 with a first group G1, a second group G2, and a third group G3 of optical fibers 17 arranged concentrically around a center Z of the fiber bundle 19. The first group G1 has the greatest distance from the center, followed by the second group G2 and the third group G3. By selectively coupling illumination light B into the groups G1, G2, G3 of optical fibers 17 or by shading certain groups G1, G2, G3 (e.g., as described above by means of intensity modulators such as AOMs), the maximum extension L of the illumination pattern 11 can be adjusted as required.

Figure 8:
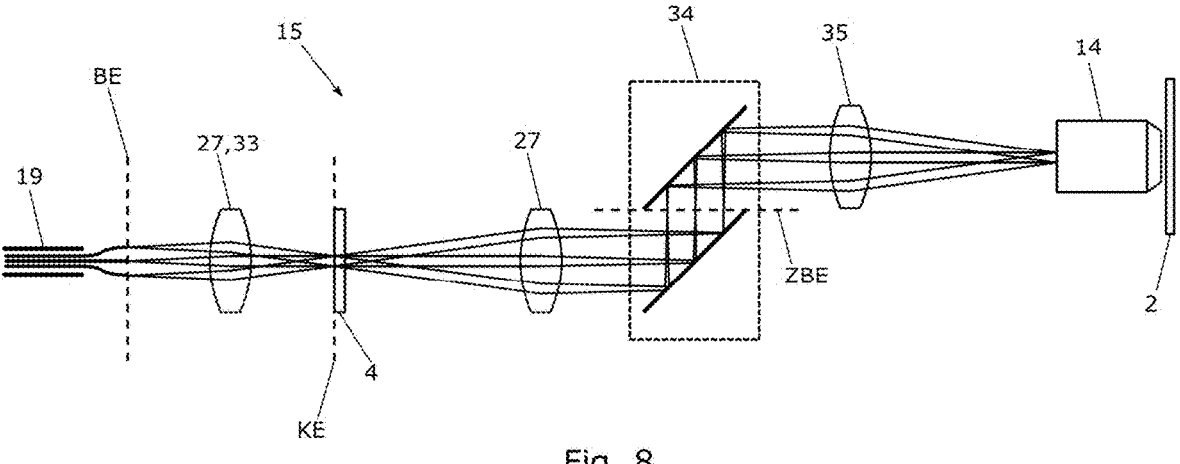
FIG. 8 illustrates the beam displacement of an illumination pattern with a galvo scanner.

FIG. 8 shows a further embodiment of a light microscope 1 according to the present disclosure comprising optical fibers 17 and a galvanometric scanner 34 for lateral displacement of the illumination pattern 11 of illumination positions 10 predetermined by the optical fibers 17 between the iteration steps of the method. The light source 3 as well as the illumination optics 15 of the light microscope 1 may be constructed analogously to the embodiments shown in FIG. 4 or 5, and the phase modulation of the individual light beams is performed as described for these embodiments, i.e., the light beams emerging from the fiber ends 18 are collimated and tilted with respect to each other by a collimator 33, with the light modulator 4 for phase modulation of the light beams being located at the intersection of the collimated light beams. Here, the fiber ends 18 are located in an image plane BE and the light modulator 4 is located in a conjugate plane KE with respect to the entrance pupil of the objective 14, which is a Fourier plane with respect to the image plane BE. The light rays phase modulated by the light modulator 4 are focused by a lens 27 (scan lens) into an intermediate image plane ZBE conjugate to the image plane BE, which is located between two adjustable mirrors of the galvanometric scanner 34. The mirrors of the galvanometric scanner 34 deflect the light beams together. They then pass through a tube lens and are focused by the objective 14 into the sample 2.

Figure 9:
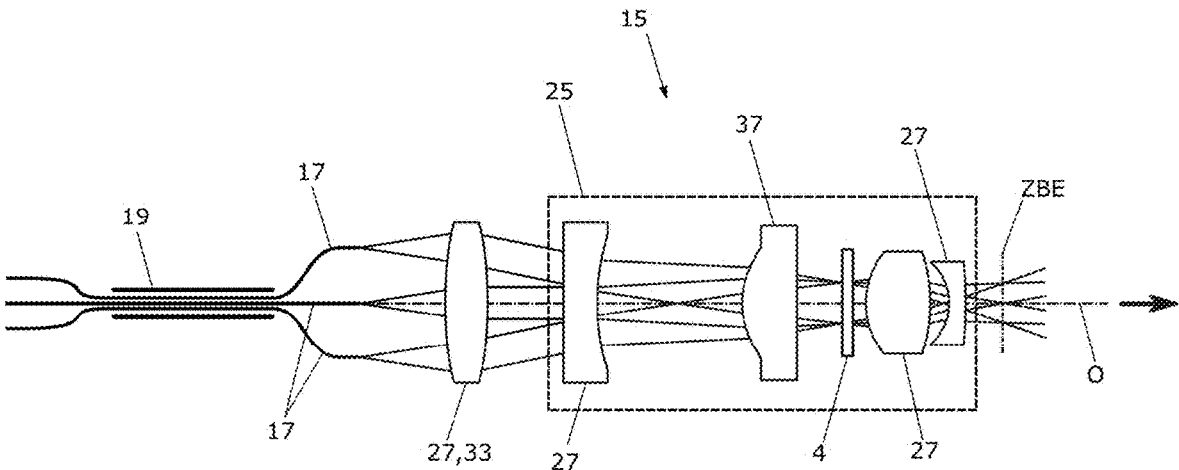
FIG. 9 illustrates the adjustment of the maximum extension of the illumination pattern using zoom optics.

In FIG. 9, a zoom optics 25 for adjusting a magnification factor is shown as part of an illumination optic 15. Such an optical system can be used to adjust the size of an illumination pattern 11 of illumination positions 10, i.e., to adjust the maximum extension L of the illumination pattern 11, in particular if required at the beginning of the main localization. The zoom optics 25 is located in the illumination beam path behind a collimator 33, which collimates and tilts against each other the light beams emerging from fiber ends 18 of optical fibers 17 of a fiber bundle 19 acting as point light sources 16. It consists of a plurality of lenses 27 and an adjustable lens 37. Between the adjustable lens 37 and a further lens 27 of the zoom optics 25, the light modulator 4 for phase modulating the illumination light B is arranged. The collimated light beams emanating from the adjustable lens 37 intersect in a plane in which the light modulator 4 is arranged and are jointly phase modulated. By moving the adjustable lens 37 along the optical axis O, the spacing of the illumination points 10 in the intermediate image plane ZBE can be adjusted.

Figure 10:
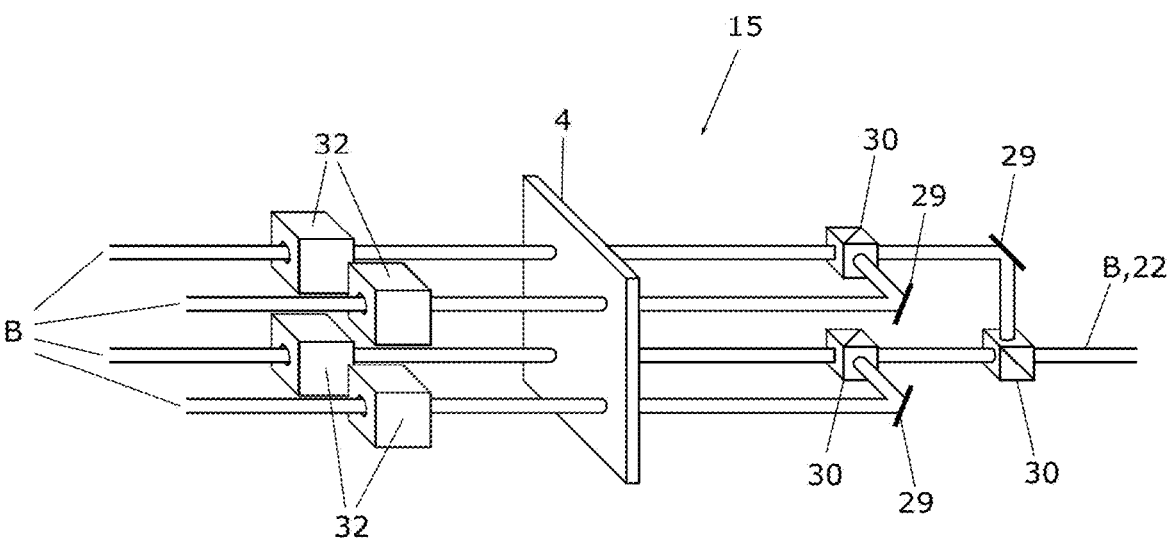
FIG. 10 shows a part of another light microscope according to the present disclosure comprising beam splitters for generating point light sources.

FIG. 10 shows part of a beam path of a light microscope 1 according to the present disclosure, in which point light sources 16 are generated without optical fibers 17 by splitting an input light beam 22 of illumination light B generated by a light source 3 (not shown) into partial beams by an illumination optics 15 comprising beam splitters 30 and mirrors 29, and by modulating the phase of the partial beams by a light modulator 4 in order to generate intensity distributions with a local minimum M at the focus in the sample 2. Behind the light modulator 4, intensity modulators 32, e.g., AOM, are arranged which control the intensity of the individual partial light beams, in particular in such a way that the illumination positions 10 are illuminated in temporal sequence, with only one partial beam reaching the sample 2 at a time, while the other partial beams are completely shadowed by the respective intensity modulators 32. Alternatively, of course, a sequence of light pulses LP may also be generated in the last described embodiment if a pulse laser is used to generate the illumination light B and the different light paths of the partial beams have corresponding different lengths.

Figure 11:
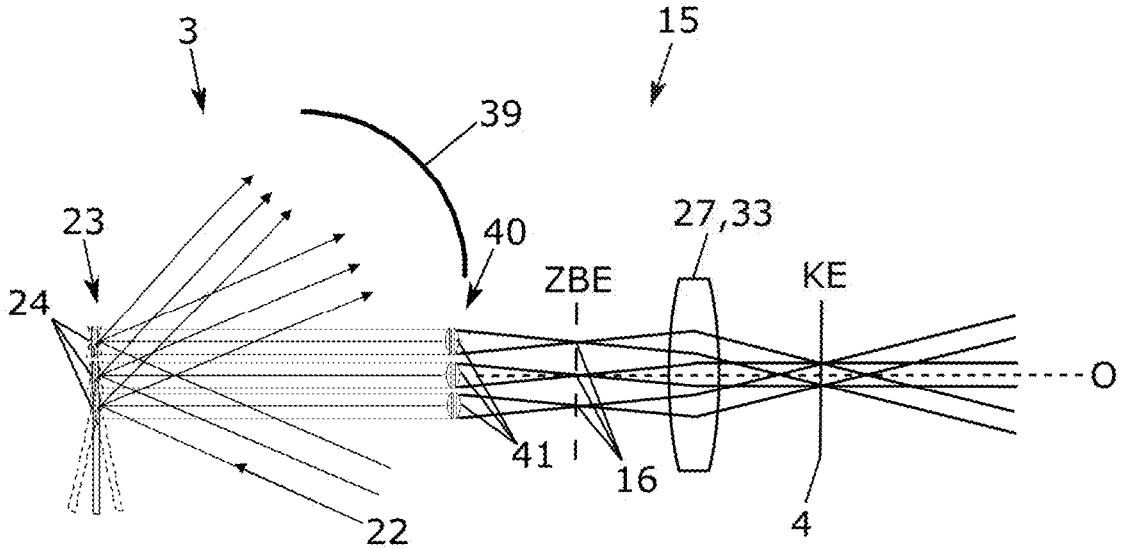
FIG. 11 shows a light source and part of the beam path of a light microscope according to the present disclosure comprising a micromirror arrangement.

FIG. 11 shows a light source 3 and a part of a beam path with illumination optics 15 of a light microscope 1 according to the present disclosure in accordance with a further example. In this case, an input light beam 22 emitted, for example, by a laser (not shown) is directed onto a micromirror arrangement 23 comprising a plurality of movable micromirrors 24. The micromirrors 24 can be individually electrically controlled to rotate the respective micromirror 24 about a respective axis of rotation. Reflection of the input light beam 22 by the micromirrors 24 produces partial light beams. By corresponding rotation of the micromirrors 24, the partial light beams are selectively coupled into the beam path of the light microscope 1 or directed to an absorber 39. By driving the micromirrors 24 in a time-shifted manner, the sample 2 (not shown in FIG. 11) can be illuminated successively at different illumination positions 10, which form an illumination pattern 11. By selecting appropriate micromirrors 24, via which the illumination light B is coupled into the beam path of the light microscope 1, the maximum extension L of the illumination pattern 11 can be set before the main localization, if required.

In the beam path behind the micromirrors 24 there is a microlens arrangement 40 which comprises several microlenses 41. The microlens arrangement 40 is positioned so that a respective microlens 41 is assigned to each micromirror 24 and focuses the illumination light B emanating from the micromirror 24 into an intermediate image plane ZBE. Behind the intermediate image plane ZBE, a collimator 33 is arranged in the diverging beam path, which collimates and tilts the light of the individual partial light beams, so that the collimated partial light beams intersect in a plane KE which is conjugate to the pupil of the objective 14 (not shown) i.e., the plane KE is a Fourier plane with respect to the intermediate image plane ZBE. At this position there is a light modulator 4 which modulates the illumination light B of the partial light beams together in its phase in order to form an intensity distribution I with a local minimum M at the focus in the sample 2 for each partial light beam.

This beam path thus corresponds in particular to the setup shown in FIG. 4 and described above. Alternatively, as in the example shown in FIG. 6, it is of course also possible here to combine the partial beams by means of beam splitters 30 and mirrors 29 and to modulate the phase of the combined light beam with the light modulator 4.

LIST OF REFERENCE SIGNS

1 Light microscope
2 Sample
3 Light source
4 Light modulator
5 Detector, first detector
6 Second detector
7 Detector element
8 Computing unit
9 Control unit
10 Illumination position
11 Illumination pattern
12 First beam deflection unit
13 Second beam deflection unit
14 Objective
15 Illumination optics
16 Point light source
17 Optical fiber
17*a* Loop
18 Fiber end
19 Fiber bundle
22 Input light beam
23 Micromirror arrangement
24 Micromirror
25 Zoom optics
26 Dichroic beam splitter
27 Lens
28 Fiber coupler
29 Mirror
30 Beam splitter
31 Laser
32 Intensity modulator
33 Collimator
34 Scanner
35 Tube lens
37 Adjustable lens
39 Absorber
40 Microlens arrangement
41 Microlens
A Scanning circuit
B Illumination light
D Light emissions
E Emitter
G1 First group
G2 Second group
G3 Third group
I Intensity distribution
BE Image layer
KE Conjugate plane
ZBE Intermediate image plane
L Maximum extension
LP Light pulse
M Minimum
O Optical axis
S Position
Z Center

The invention claimed is:

1. A method for localizing individual emitters in a sample, comprising a pre-localization comprising the steps of
illuminating the sample with illumination light, wherein the illumination light induces or modulates light emissions from an individual and stationary emitter in the sample;

detecting the light emissions from the emitter;

estimating the position of the emitter in the sample from the detected light emissions;

and a subsequent main localization comprising the steps of illuminating the sample with an intensity distribution the illumination light or another illumination light at illumination positions, the intensity distribution comprising a local minimum;

detecting the light emissions of the emitter for the respective illumination positions;

determining the position of the emitter in the sample from the light emissions detected for the illumination positions, wherein the illumination positions in the main localization are arranged in a first iteration around the position of the emitter estimated in the pre-localization, at least one second iteration being carried out after the first iteration, the illumination positions in the at least one second iteration being arranged around the position of the emitter determined in the preceding iteration, wherein the illumination positions in the first iteration and the at least one second iteration form a respective illumination pattern comprising a maximum extension, wherein the maximum extension of the illumination pattern is kept constant during the main localization.

2. The method according to claim 1, wherein the illumination positions of the illumination pattern remain constant relative to each other during the first iteration and the at least one second iteration, wherein the illumination pattern is repositioned at the beginning of the at least one second iteration so that the illumination positions of the illumination pattern are arranged around the position determined in the respective preceding iteration.

3. The method according to claim 1, wherein the illumination light is excitation light that induces the light emissions of the emitter.

4. The method according to claim 1, wherein the illumination positions are arranged on a scanning circle or a scanning sphere around the estimated position of the emitter or around the position of the emitter determined in the respective preceding iteration, the maximum extension corresponding to the diameter of the scanning circle or the scanning sphere.

5. The method according to claim 1, wherein the illumination pattern is a grid.

6. The method according to claim 1, wherein a total photon number of photons to be registered is determined for the emitter, said total photon number being divided into a first photon number and a second photon number, wherein the position of the emitter in the pre-localization is estimated when the light emissions detected in the pre-localization reach the first photon number.

7. The method according to claim 6, wherein the position of the emitter in the main localization is determined when the light emissions detected in the main localization reach the second photon number.

8. The method according to claim 1, wherein the position estimated in the pre-localization comprises a greater position uncertainty than the position of the emitter determined in the main localization.

9. The method according to claim 1, wherein the estimation of the position of the emitter in the pre-localization is performed with a non-iterative method.

10. The method according to claim 1, wherein the sample is scanned in the pre-localization with a focus or an intensity minimum of the illumination light, or in that a wide-field image of the sample is generated in the pre-localization.

11. The method according to claim 1, wherein the positions of a plurality of emitters are estimated in the pre-localization, wherein a first emitter is selected from the plurality of emitters, and wherein the position of the first emitter is determined in the main localization.

12. The method according to claim 1, wherein the light emissions from the emitter are detected during the pre-localization with a detector comprising a plurality of detector elements.

13. The method according to claim 12, wherein the position of the emitter estimated during the pre-localization is determined with a position estimator or by a moment determination based on the light emissions detected by the detector elements.

14. The method according to claim 12, wherein a function is fitted to data obtained from light emissions detected by the detector elements, wherein the position estimated during the pre-localization is determined from the fitted function.

15. The method according to claim 1, wherein the light emissions of the emitter are detected during the main localization with a detector comprising a plurality of detector elements.

16. The method according to claim 12, wherein single photons emitted by the emitter and detected by the detector elements of the detector are registered.

17. The method according to claim 15, wherein single photons emitted by the emitter and detected by the detector elements of the detector are registered.

18. The method according to claim 1, wherein the arrangement of the illumination positions is fixed by at least one light source and/or by an illumination optics during the localization of the emitter.

19. The method according to claim 18, wherein the sample is illuminated with the illumination light at the illumination positions via respective point light sources.

20. The method according to claim 19, wherein the point light sources are formed by respective fiber ends of optical fibers from which the illumination light emerges.

21. The method according to claim 20, wherein at least two groups of optical fibers are provided, wherein a maximum extension of the illumination pattern is adjusted by a selection of one of the groups.

22. The method according to claim 19, wherein the point light sources are formed by reflecting an input light beam off one or more micromirrors of a micromirror array.

23. The method according to claim 18, wherein the illumination positions are adjustable between different main localizations.

24. The method according to claim 1, wherein the sample is illuminated by means of light pulses of the illumination light, successive light pulses being assigned to different illumination positions.

25. A light microscope for performing the method according to claim 1.

26. A non-transitory computer-readable medium for storing computer instructions for localizing individual emitters in a sample that, when executed by one or more processors associated with a light microscope causes the one or more processors to perform a method according to claim 1.

27. Use of a fiber bundle comprising a plurality of optical fibers in a method according to claim 1, wherein the sample is illuminated with the illumination light via respective fiber ends of the optical fibers at the illumination positions.

* * * * *